United States Patent [19]

Sreenivas

[11] Patent Number: 5,132,694
[45] Date of Patent: Jul. 21, 1992

[54] MULTIPLE-BEAM ARRAY ANTENNA

[75] Inventor: Ajay Sreenivas, Lafayette, Colo.

[73] Assignee: Ball Corporation, Muncie, Ind.

[21] Appl. No.: 687,845

[22] Filed: Apr. 19, 1991

Related U.S. Application Data

[63] Continuation of Ser. No. 373,793, Jun. 29, 1989.

[51] Int. Cl.$^5$ .......................... H01Q 3/22; H01Q 3/24; H01Q 3/26
[52] U.S. Cl. .................................................. 342/373
[58] Field of Search ............................. 342/373, 354

[56] References Cited

U.S. PATENT DOCUMENTS

| | | | |
|---|---|---|---|
| 3,868,695 | 2/1975 | Kadak | 343/778 |
| 4,277,787 | 7/1981 | King | 343/100 |
| 4,544,927 | 10/1985 | Kurth et al. | 343/373 |
| 4,728,805 | 3/1988 | Dempsey | 250/578 |
| 4,868,886 | 9/1989 | Assal et al. | 342/354 |
| 4,924,235 | 5/1990 | Fujisaka et al. | 342/374 |
| 4,965,588 | 10/1990 | Lenormand et al. | 342/373 |

OTHER PUBLICATIONS

Kampinsky, A., et al., *ATS-F Spacecraft: An EMC Challenge*, 16th EM Compatibility Symp., San Francisco, CA (Jul. 16–18, 1974).

Jakstys, V. J., et al., *Composite ATS F&G Satellite Antenna Feed*, 7th Inst. Electron, Eng. Ann Conf. Commun. Proc., Montreal (Jun. 1971).

*Antenna Engineering Handbook*, 2d. ed., New York, McGraw-Hill Book Co., 1984 pp. 17-41—17-50, 19-7—19-10 20-56—20-60, 35-10—35-17, 36-10—36-13, 40-17—40-18.

Primary Examiner—Theodore M. Blum
Attorney, Agent, or Firm—Gilbert E. Alberding

[57] ABSTRACT

An antenna capable of transmitting and or receiving multiple beams and particularly adapted for use with satellites. In a preferred embodiment, the antenna includes a plurality of transmit channels interconnected with a first beamforming matrix. The first beamforming matrix communicates with channel preamplifiers such that two or more transmit signals can be inputted to the first beamforming matrix. The first beamforming matrix communicates with an array of transmit elements, which is preferably divided into two or more transmit subarrays. In one example of operation, two or more beams can be contemporaneously transmitted from the transmit subarrays with the at least one of the transmit subarrays contributing to the formation of at least two of the beams.

In the same preferred embodiment, as described immediately above, the antenna includes a plurality of receive channels interconnected with a second beamforming matrix such that two or more receive signals can be outputted from the second beamforming matrix to the channel receivers. The second beamforming matrix communicates with an array of receive antenna elements which is preferably divided into two or more receive subarrays. In one example of operation, two or more beams can be contemporaneously received by the receive subarrays with at least one of the receive subarrays contributing to the reception of at least two of the beams.

In another embodiment, circulators and/or diplexers can be utilized so that common antenna elements and a common beamforming matrix can be employed for both transmission and reception. Consequently, two or more beams can be contemporaneously transmitted from and/or received at the transmit/receive antenna elements, with at least one of the subarrays contributing to the formation and/or reception of at least two of the beams.

23 Claims, 5 Drawing Sheets

MULTIPLE-BEAM ARRAY ANTENNA

RELATED APPLICATIONS

This application is a continuation of U.S. patent application Ser. No. 07/373,793 by Sreenivas, filed June 29, 1989 and entitled "Multiple-Beam Array Antenna".

FIELD OF THE INVENTION

The present invention relates to an antenna particularly adapted for multiple-beam operation, and more particularly, to a multiple-beam array antenna which is capable of contemporaneously transmitting and/or receiving a plurality of beams of varying gain, directivity and/or frequency. The antenna minimizes space, weight, componentry and power requirements through a highly effective beamforming means, and can be advantageously employed in a variety of satellite and other communication-oriented applications.

BACKGROUND OF THE INVENTION

It is becoming increasingly desirable to simultaneously transmit and/or receive two or more beams. For example, with the advent of satellite cable communications, there has been a growing interest in simultaneously receiving and/or transmitting multiple signals with a single earth station antenna. This interest has prompted the development of several earth-based, multiple-beam antenna configurations employing fixed reflectors and multiple discrete feeds. Three commonly employed multiple-beam earth station antennas are the spherical-reflector antenna, the torus antenna and the offset-fed parabolic antenna, and offset-fed Cassegrain antenna.

As the viability and use of satellite communications have increased, so has the need to consolidate satellite operations. More particularly, it is quite desirable for a satellite antenna arrangement to have the capability of contemporaneously receiving and/or transmitting multiple beams to and from several earth stations, including both stationary and mobile earth stations. Due in large part to space, weight, mechanical complexity beam separation and stability considerations, the above-noted earth station antennas have not been widely employed for multiple-beam satellite applications, and arrangements employing multiple antenna elements, such as simple dipole arrays, have been developed.

In such satellite antennas, the antenna elements typically cooperate so that through the employment of multiple arrays, multiple-beam operation can be achieved. Despite advances in this relatively new field of endeavor, the goal of further minimizing space, weight, and complexity requirements, while maximizing system flexibility and performance, remains. Accordingly, the present invention is directed to a satellite antenna system wherein multiple-beam operation is achieved through the use of a unique antenna arrangement wherein two or more antenna arrays can be selectively employed to contemporaneously contribute to the contemporaneous transmission and/or reception of one or more beams. As will become apparent to those skilled in the art, such an arrangement allows for minimization of space, weight and componentry requirements, while optimizing system flexibility and performance.

SUMMARY OF THE INVENTION

From a transmission standpoint, the multiple-beam antenna of the present invention comprises antenna means, and beamformer means for receiving input transmission signals and providing beamformer transmission signals to the antenna means. The antenna means and beamformer means are provided such that the antenna may contemporaneously transmit at least two transmission beams, wherein at least two of the antenna means contribute to the formation of at least one of such transmission beams. The beamformer means generally includes means for establishing which of the antenna means will contribute to the formation of each of the transmission beams, and further includes means for establishing the relative power contribution of the antenna means to the transmission beams.

In a preferred embodiment, a separate input transmission signal corresponding with each of the transmission beams is provided to the beamformer means. Further, the beamformer means comprises a separate power dividing means and interconnected phasing means to receive each of the separate input transmission signals, and a separate weighting means and interconnected combining means to provide each of the beamformer transmission signals. Such components of the beamformer means are interconnected to define a matrix configuration.

In the preferred embodiment, it is also desirable to include power means for establishing the power of each of the separate input transmission signals provided to the beamformer means. Additionally, amplifier means may be interposed between the beamformer means and antenna means for amplifying the beamformer transmission signals. Finally, it will be apparent to those skilled in the art that each of the contemplated antenna means could advantageously include an array of antenna elements.

From a reception standpoint, the multiple-beam antenna of the present invention comprises antenna means, and beamformer means for receiving input reception signals from the antenna means and providing beamformer reception signals corresponding with each of the received beams to be processed. Antenna means and beamformer means are provided such that the antenna may contemporaneously receive at least two reception beams and provide at least two beamformer reception signals corresponding therewith, wherein at least two of the antenna means contribute to the formation of at least one of such beamformer reception signals. The beamformer means generally includes means for establishing which of the antenna means will contribute to the formation of each of the beamformer reception signals, and further includes means for establishing the relative power contribution of the antenna means to the beamformer reception signals.

In a preferred embodiment, the beamformer means comprises a separate dividing and interconnected weighting means to receive each of the input reception signals, and a separate phasing and interconnected combining means to provide each of the beamformer reception signals. Such components of the beamformer means are interconnected to define a matrix configuration.

In the preferred embodiment, it is also desirable to utilize an array of antenna elements to define each of the antenna means and to interpose amplifier means between the antenna means and the beamformer means.

Additionally, a processor means would be utilized for processing the beamformer reception signals.

From both a transmission and reception standpoint, the above-described transmission antenna and reception antenna can be consolidated to achieve dual usage of the antenna means and beamformer means. In such applications, the frequency range for transmission beams and frequency range for reception beams are substantially non-overlapping. In a preferred embodiment, a discriminating means may be interposed between the antenna means and beamformer means to discriminate between beamformer transmission signals and input reception signals.

Numerous advantages of the present invention will be appreciated by those skilled in the art.

A principal advantage of the present invention is that it is capable of acceptably transmitting and receiving a multiplicity of beams in a manner that promotes accuracy and precision while minimizing space, weight and componentry requirements. Due to the structure of the antenna, it is particularly flexible in operation, being equally capable of transmitting/receiving a few beams as well as a relatively large number of beams. The antenna is well adapted for use on satellite support structures.

More particularly, the antenna subarrays of the present invention function in combination to service multiple beams such that efficiency in operation as well as reduction in space, cost and componentry are realized. This is, by grouping radiating elements together into a predetermined number of cooperating subarrays, feed componentry requirements, and hence power consumption as well as antenna weight and complexity are considerably reduced.

Another advantage of the present invention is that the beamforming means enhances operation through its ability to flexibly and effectively form beams possessing high levels of gain and directivity. That is, the beamforming means is provided with circuitry which is readily provided to impart desired levels of phase and amplitude to each beam. Consequently, for each beam, desired geographic coverage over designated regions, and desired levels of beam amplitude for each of the designated regions, can be achieved.

Another advantage of the present invention is that through use of a separate antenna means (e.g., antenna element arrays) to transmit and/or receive beams, beam separation constraints generally imposed by multi-beam reflector antennas, are substantially avoided.

A still further advantage of the present invention is that componentry which interfaces the beamforming means with the subarrays is designed to provide both optimum signal processing and significant cost savings as a result of reduced power consumption. More particularly, with respect to the case for beam transmission, positioning of amplifiers "downstream" of the beamforming means, allows for processing of signals at amplitudes that are significantly less than they would be if amplifiers were positioned "upstream" of the beamforming means. Redundancy switching, linearizing and bandpass filtering further ensure that reliability in processing is realized and that properly weighted signals of desired frequency are achieved.

It is yet another advantage of the present invention that transmission and reception of multiple beams can be performed simultaneously. Simultaneous operation is achieved by transmitting in one frequency band and receiving in another frequency band. In one preferred embodiment, simultaneous operation is realized using one array, thus allowing for further reduction in componentry and costs.

These and other features, advantages and objects of the present invention, will be further understood and appreciated by those skilled in the art by reference to the following written specification, claims and appended drawings.

DETAILED DESCRIPTION OF THE PREFERRED EMBODIMENTS

For purposes of description herein, the terms "upper," "lower," "right," "left," "rear," "front," "vertical," "horizontal" and derivatives thereof shall relate to the invention as oriented in the drawings attached herewith. However, it is to be understood that the invention may assume various alternative orientations, except where expressly specified to the contrary. It is also to be understood that the specific devices illustrated in the attached drawings, and described in the following specification, are simply exemplary embodiments of the inventive concepts defined in the appended claims. Hence, specific dimensions, and other physical characteristics relating to the embodiments disclosed herein are not to be considered as limiting, unless the claims by their language expressly state otherwise.

The reference numeral 10 (FIG. 1) generally designates a multiple-beam planar array antenna embodying the present invention. Planar array antenna 10 is particularly adapted for use on satellites, such as the illustrated communications satellite 12. Such antenna 10 could, by way of example, be employed for communications with earth/based, stationary and/or mobile stations. In the present example, satellite 12 is a geostationary satellite positioned over a particular region of the earth, such as the United States.

As with satellites in general, satellite 12 (FIGS. 1 and 2) includes a body 14 interconnected with booster 16 and solar panels 18. In the present example, antenna 10, which includes transmit panel 20 and receive panel 22, is mounted on the forward surface of body 14. Panels 20 and 22 are connected by use of hinge 24. In the preferred embodiment, panels 20 and 22 (FIG. 2) are folded together prior to launching of satellite 12. Once in space, however, a switch is triggered so that panels 20 and 22 become substantially coplanar. As will be explained in further detail below, panels 20 and 22 could be incorporated into a single panel through which both transmission and reception would be performed. The circuitry of antenna 10 for transmitting and receiving beams is shown in schematic form in FIGS. 3-4. As will be appreciated by those skilled in the art, conventional hardware can be utilized to yield such circuitry, and can be mounted proximate to the forward portion of body 14.

Figure 2:
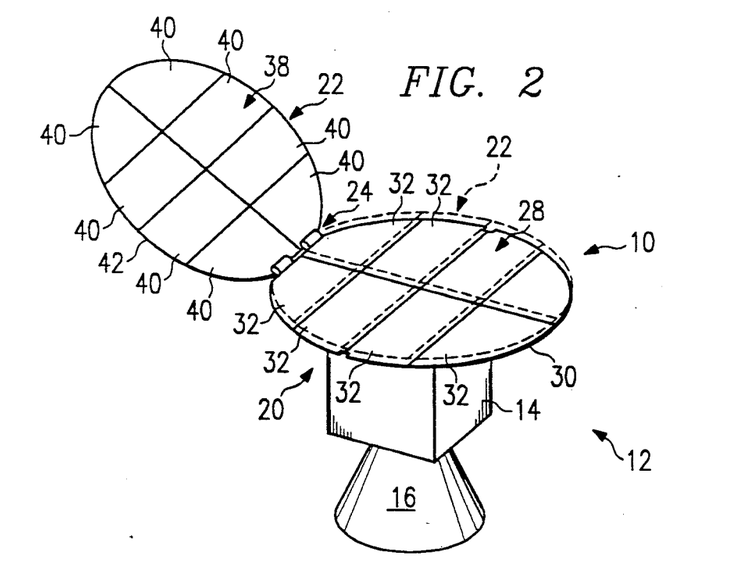
FIG. 2 is a perspective view of the satellite with the antenna mounted thereon.

Panels 20 and 22 can be of like construction. Referring particularly to FIG. 2, transmit panel 20 includes a transmit antenna array 28 mounted on a backing plate 30 that could, for example, be of aluminum honeycomb construction. In the preferred embodiment, transmit antenna array 28 is circular and of a microstrip construction. Further, the antenna array 28 is subdivided into discrete transmit subarrays 32, each of which includes a predetermined number of microstrip antenna elements. In one example, each of the microstrip elements can be corner fed and is nearly square such that circular polarization is realized.

As is typical in array arrangements, the antenna elements of each of the transmit subarrays 32 can contribute to combinatively transmit radiation from the transmit subarrays 32. As will be explained in further detail below, however, and of particular importance here, the radiation pattern which may be generated from any one of transmit subarrays 32 need not function in the present invention to define any one beam or to contribute to all beams transmitted by the antenna 10. Rather, the radiation patterns of two or more of transmit subarrays 32 can contemporaneously and selectively contribute to transmit and/or receive one or more beams of varying frequency, gain and/or directivity. As mentioned, received panel 22 (FIG. 2) can be constructed the same as transmit panel 20. Receive panel 22 includes a receive array assembly 38 comprising receive subarrays 40 mounted on a backing plate 42.

In the preferred embodiment, transmission is performed within the S-band while receiving is performed within the L-band. It should be appreciated that other frequency bands could be used for transmitting and receiving without changing the function of antenna 10. As explained in further detail below, use of two different frequency bands advantageously allows for simultaneous transmission/reception of beams when transmit panel 20 and receive panel 22 are integrated into one panel.

Figure 3:
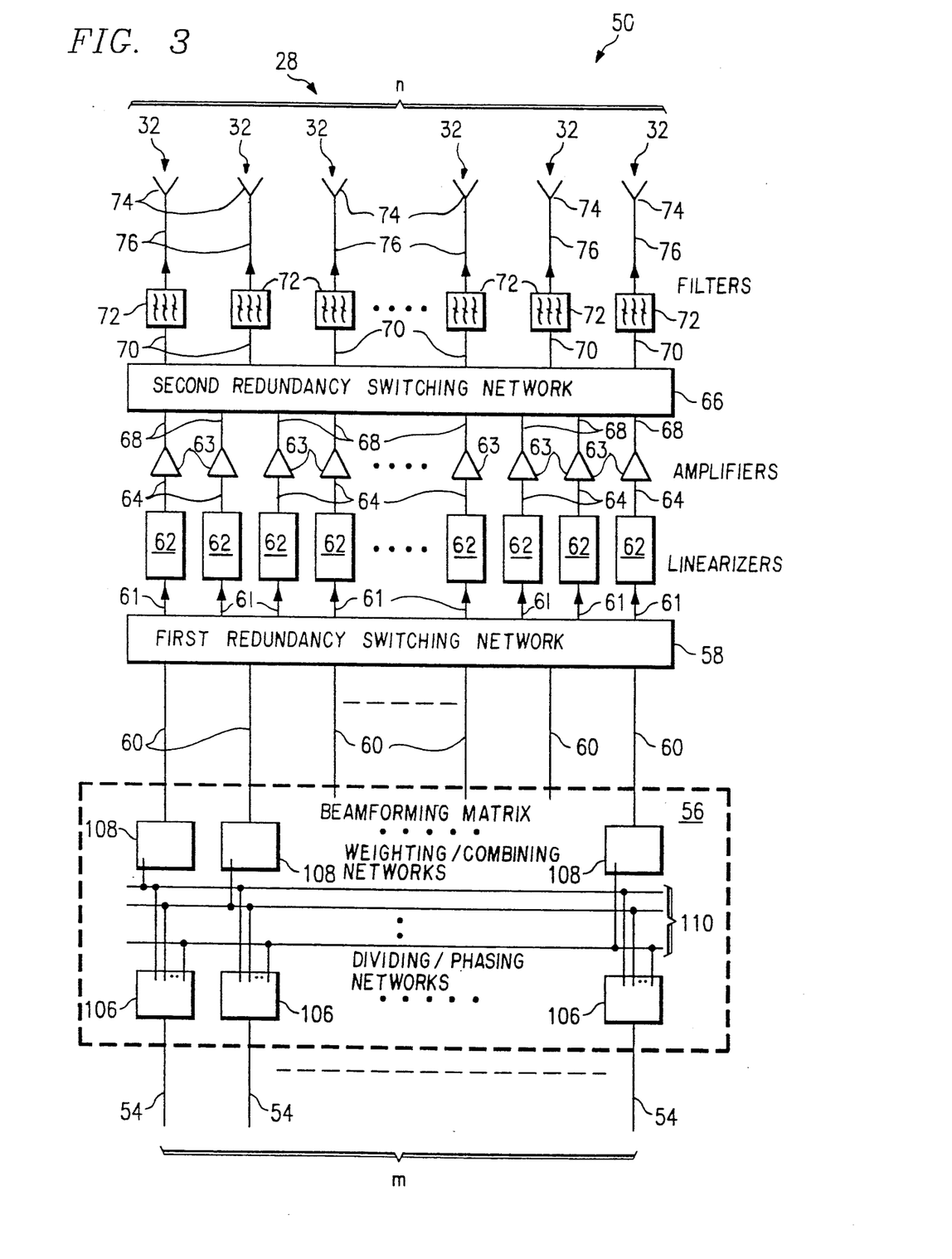
FIG. 3 is a schematic view of a transmit system for the antenna.
Figure 4:
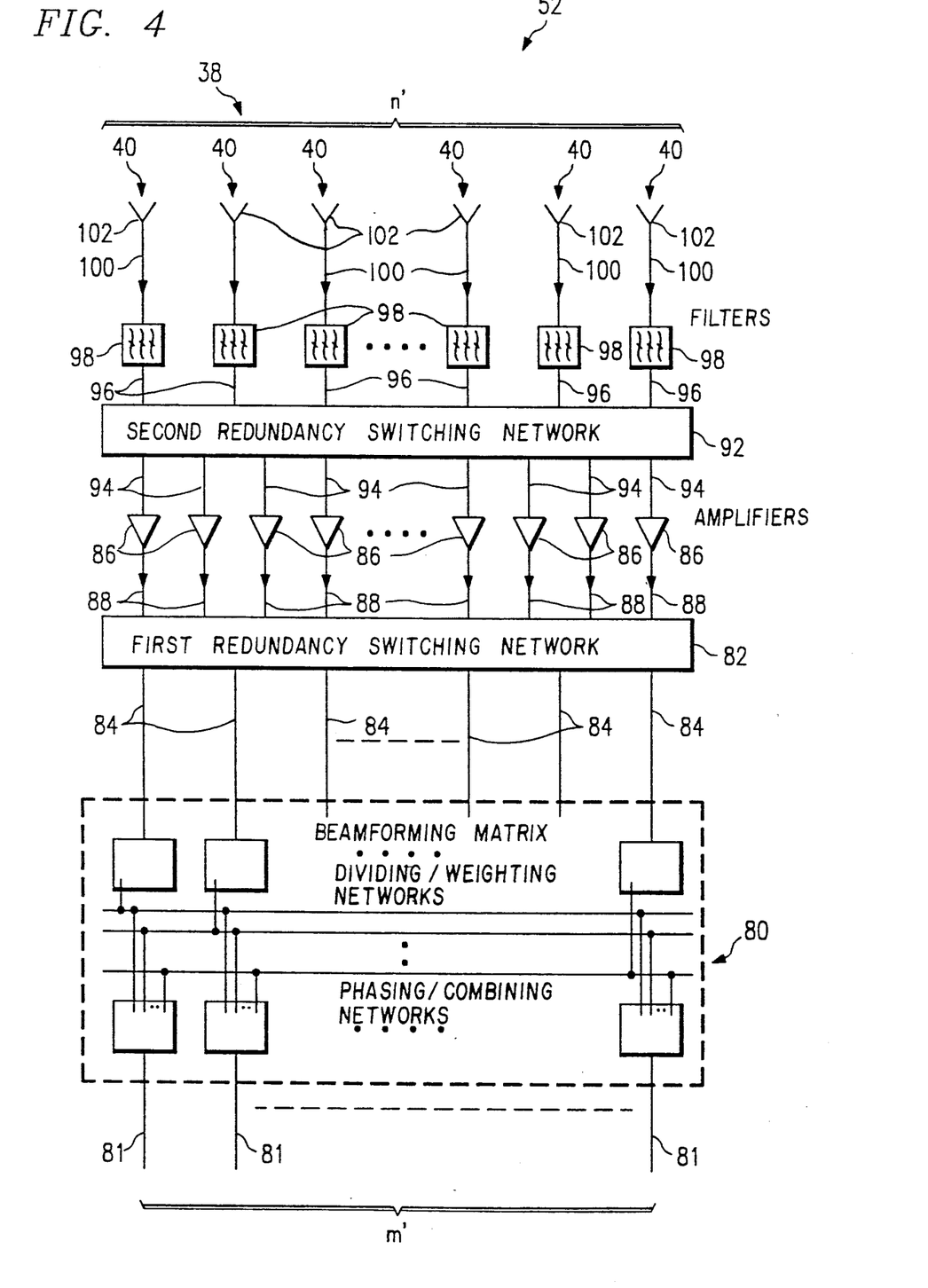
FIG. 4 is a schematic view of a receive system for the antenna.

Referring to FIGS. 3 and 4, schematic drawings of the circuitry for a trnsmit antenna system 50 and a receive antenna system 52, respectively, are provided. For explantation purposes, FIGS. 3 and 4 show up to n transmit subarrays 32 and up n' receive subarrays 40, respectively, substantially any number of each could be employed. Similarly, it should be appreciated that while the examples of FIGS. 3 and 4 are for a system capable of transmitting up to m beams and receiving up to m' beams, antenna 10 is, in general, capable of transmitting and receiving any number of beams, limited only by space constraints attendant to the intended applications of antenna 10.

In the preferred embodiment, receiving is essentially the converse of transmitting; therefore, only the elements associated with the case for transmitting are explained in detail. As illustrated in FIG. 3, up to m transmit signals are provided by as many as m channel preamplifiers and power means, or, in another example, by a multiplexer (not shown), via channels 54 to a beamforming means 56, which in the preferred embodiment is a beamforming matrix. As many as n outputs of beamforming means 56 are communicated to redundancy switching network 58 via lines 60.

Lines 61 interconnect first redundancy switching network 58 with linearizers 62, and amplifiers 63 are interconnected with linearizers 62 via lines 64. Linearizers 62 serve to maintain operation of antenna 10 in the linear range such that, for example, the outputs from amplifiers 63 are proportional to the corresponding outputs from beamforming means 56. While transmit system 50 can be operated in a nonlinear range, when doing so conventional signal weighting techniques would be povided to ensure that desired transmission is realized in response to the beamforming matrix outputs. Outputs from amplifiers 63 are interconnected with second redundancy switching network 66, via lines 68, and in turn, lines 70 interconnect second redundancy switching network 66 with bandpass filters 72.

It should be appreciated by those skilled in the art that first redundancy switching network 58 and second redundancy switching network 66 function in combination to ensure that when up to a predetermined number of p,p, amplifiers fail in operation, each of the signals outputted from beamforming means 56 will still be amplified as necessary for acceptable transmissions. In one example, two to four "backup" amplifiers are provided for every 8 of amplifiers 63. The value of p may be varied according to the amount of system failure that can be tolerated by antenna 10. As will also be apparent to those skilled in the art, in another preferred embodiment, first redundancy switching network 58 and second redundancy switching network 66 could be combined to function as one network without affecting the operation of transmit system 52.

It should be noted, that in the preferred embodiment, no more than n amplifiers 63 need actually be employed to service n transmit subarrays 32, thereby contributing to minimization of space, weight and componentry. Additionally up to n bandpass filters 72 may be employed to service up to n transmit subarrays 32. The outputs of the bandpass filters 72 are interconnected with transmit subarrays 32 of transmit panel 20 via lines 76.

As mentioned above, receive system 52 is equivalent to transmit system 50 except that the flow of signals in receive system 52 is opposite to that of transmit system 50. Consequently, receive system 52 includes the same basic componentry, arranged in the same order, as transmit system 50. In the preferred emobodiment, transmit panel 20 and receive panel 22 are separate units, so that the number of transmit subarrays 32 need not be the same as the number of receive subarrays 40. As discussed below, even in another preferred embodiment, in which transmission and reception are realized on the same panel, the number of subarrays employed to achieve transmission and reception need not be the same. In the example of FIG. 4 receive system 52 is adapted to receive up to m' beams through use of up to n' receive subarrays 40. As with the values of m and n, the values of m' and n' are only limited by hardware and other predetermined constraints for the intended application of antenna 10.

As shown in FIG. 4, receive system 52 includes beamforming means 80, which has up to m' channel receiving lines 81 as outputs. Beamforming means 80 is interconnected with first redundancy swithching network 82 via lines 84, and amplifiers 86 interconnected with first redundancy switching network 82 via lines 88. Amplifiers 86 are interconnected to second redundancy switching network 92 via lines 94, while lines 96 interconnect bandpass filters 98 with second redundancy switching network 92. As with transmit system 50, first redundancy network 82 and second redundancy network 92 could be combined into a single network without impairing operation of receive system 52. Lines 100 serve to communicate radiation from receive subarrays 40 to band pass filters 98.

Figure 5:
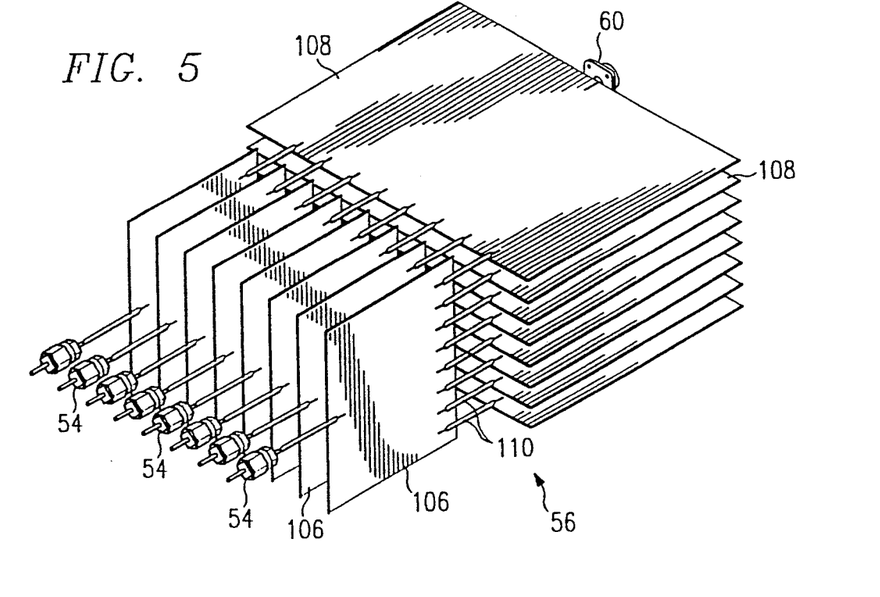
FIG. 5 is a perspective view of a beamforming matrix employed to effect transmission and reception in the antenna.

Central to the operation of both transmit system 50 and receive system 52 is beamforming means 56 and beamforming means 80, respectively. Beamforming means 56 of the transmit system 50 is structurally equivalent to beamforming means 80 of the receive system 52, so that the following discussion serves as the description of the components and structure for beamforming means 56 and beamforming means 80. It is of particular importance that beamforming means 56 includes dividing/phasing networks 106 and weighting/combining networks 108. In the example of FIG. 5, as many as m dividing/phasing networks 106 are interconnected with up to n weighting/combining networks 108 by way of as many as m×n matrix interconnections 110.

Figure 6A:
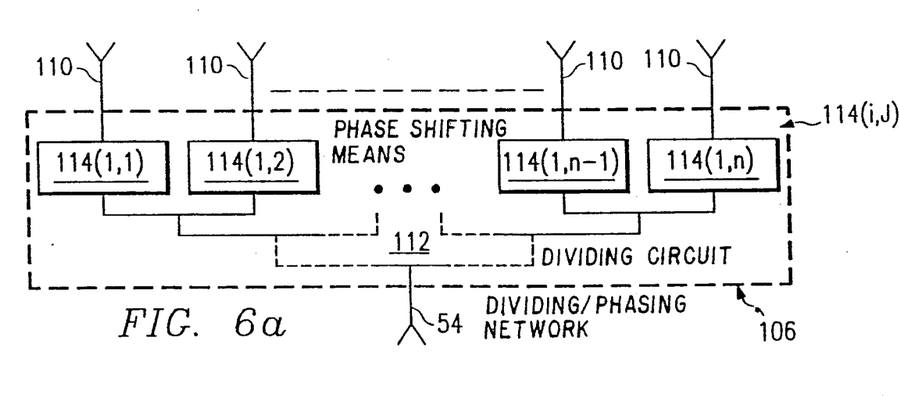
FIG. 6a is a partial schematic view of a dividing/phasing circuit of the beamforming matrix of FIG. 5.

As illustrated in FIG. 3 and FIG. 6a, each of dividing/phasing networks 106 includes a dividing circuit 112, which in the preferred embodiment may be a corporate dividing arrangement, and phase shifting means 114($i,j$). As will be appreciated, i and j are any real numbers, and conventional time delay means could also be employed to provide the phasing function for each of dividing/phasing networks 106. In the example of FIG. 6, up to n-way division of each signal inputted via channels 54 is realized through use of dividing circuit 112, and the desired phase adjustment for each signal is imparted to each resulting subsignal by one of as many as n phase shifting means 114($i,j$), which in FIG. 6, are designated in matrix form as 114($l,l$) to 114($l,n$). As should be appreciated, for the mth one of dividing circuits 112, the matrix notation for phase shifting means 114($i,j$) would be 114($m,l$) to 114($m,n$).

Figure 6B:
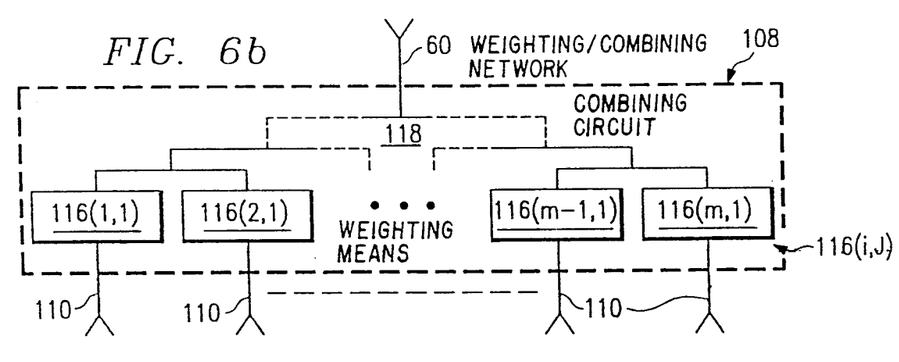
FIG. 6b is a partial schematic view of a weighting/combining circuit of the beamforming matrix of FIG. 5.

As illustrated in FIGS. 3 and 6b, each of weighting/combining networks 108 include power weighting means 116($i,j$), which are designated in matrix form as 116($l,l$) to 116($m,l$), and combining circuit 118, which in the preferred embodiment is a corporate combining arrangement. As should be appreciated, i and j are any real numbers, and for the nth one of weighting/combining networks 108, the matrix notation for power weighting means 116($i,j$) would be 116($l,n$) to 116($m,n$). Moveover, it should be noted that weighting means 116($i,j$) could be realized through use of conventional passive elements or by using microstrip lines of varying widths positioned between ends of matrix interconnections 110 and combining circuit 118. In general, for each of weighting/combining networks 108, as many as n weighting means 116($i,j$) can be employed.

As will be appreciated, the above-described arrangement allows for the selective and contemporaneous contribution of one or more of the transmit subarrays 32 and/or receive subarrays 40 to multiple-beam transmission and/or receipt, respectively. That is, by selectively dividing, phase-shifting, weighting and combining transmit signals, each of up to n transmit subarrays 32 can simultaneously contribute to the transmission of each of up to m beams. Similarly, by selectively dividing, weighting, phase-shifting and combining receive signals, each of up to n' receive subarrays 40 can contemporaneously contribute to the reception of each of up to m' beams.

In operation, transmit system 50 and receive system 52 operate in much the same way except that during transmission (FIG.3) signal flow is from as many as m channel preamplifiers (not shown) to as many as n transmit subarrays 32 so that up to m beams are directed away from transmit array assembly 28, while during reception (FIG. 4) beams are directed toward receive array assembly 38 and signal flow is from as many as n' receive subarrays 40 to as many as m' channel receivers (not shown).

Referring particularly to FIG. 3, a desired number of up to m signals to be transmitted from transmit array assembly 28, are communicated by channels 54 to beamforming means 56. Each of signals transmitted via channels 54 is, for example, then divided as many as n ways into as many as n subsignals and a predetermined phase adjustment is imparted to each of the subsignals by way of phase shifting means 114 ($i,j$), and the subsignals are then communicated across matrix interconnections 110. Such phase adjustments are made in direct relation to those transmission beams to which the various transmit subarrays 32 are to contemporaneously and selectively contribute. Consequently, the outputs of dividing/phasing networks 106 are typically non-identical. That is, the value of the phase imparted by phase shifting means 114($i,j$) will generally vary within each dividing/phasing network 106 and from one dividing/phasing network 106 to another.

The subsignals from each of the dividing/phasing network 106 are communicated to a corresponding one of as many as n weighting/combining networks 108. In the example of FIG. 3, each of the subsignals received by any one of the weighting/combining networks 108 are weighted by weighting means 116($i,j$), and then such subsignals are combined by combining circuit 118 to form a beamforming signal having up to m beamforming subsignals, to be transmitted via line 60 to first redundancy switching network 58. The beamforming signals are transmitted to amplifiers 63 to raise the beamforming signals to acceptable levels for transmission from transmit array assembly 28. In general, as many as n beamforming signals can be generated by beamforming means 56.

As previously noted, componentry minimization is achieved by positioning amplifiers 63 "downstream" of beamforming means 56. Further, since power is dissipated during beamforming, the positioning f ammplifiers 63 "downstream" minimizes overall system power consumption. That is, of course, quite important in satellite applications.

The amplified signals are filtered at bandpass filters 72 to ensure that transmission is performed within the desired band, which in the preferred embodiment is the S-band. Each of the filtered signals are then transmitted to one of transmit subarrays 32.

It is particularly significant tht the total radiation pattern generated by transmit array assembly 28, to yield up to m beams, can result from a combination of any one or more radiation patterns of two or more transmit subarrays 32. Due to the operation of both dividing/phasing networks 106 and weighting/combining networks 108 each of the radiation patterns generated by each of the transmit subarrays 32 can possess up to m different phases and m different corresponding amplitudes. As the radiation patterns from the transmit subarrays 32 are combined to form the total radiation pattern, up to m beams having up to m phases and up to m amplituded are formed.

With the above theory of operation in mind, it should be evident that the phase and/or amplitude of any one of the generated beams could be varied by merely adjusting the phase and/or weight of any one of the subsignals processed in beamforming means 56. More specifically, as mentioned above, phase and amplitude of one or more of the beams can be selectively and effectively established.

Figure 1:
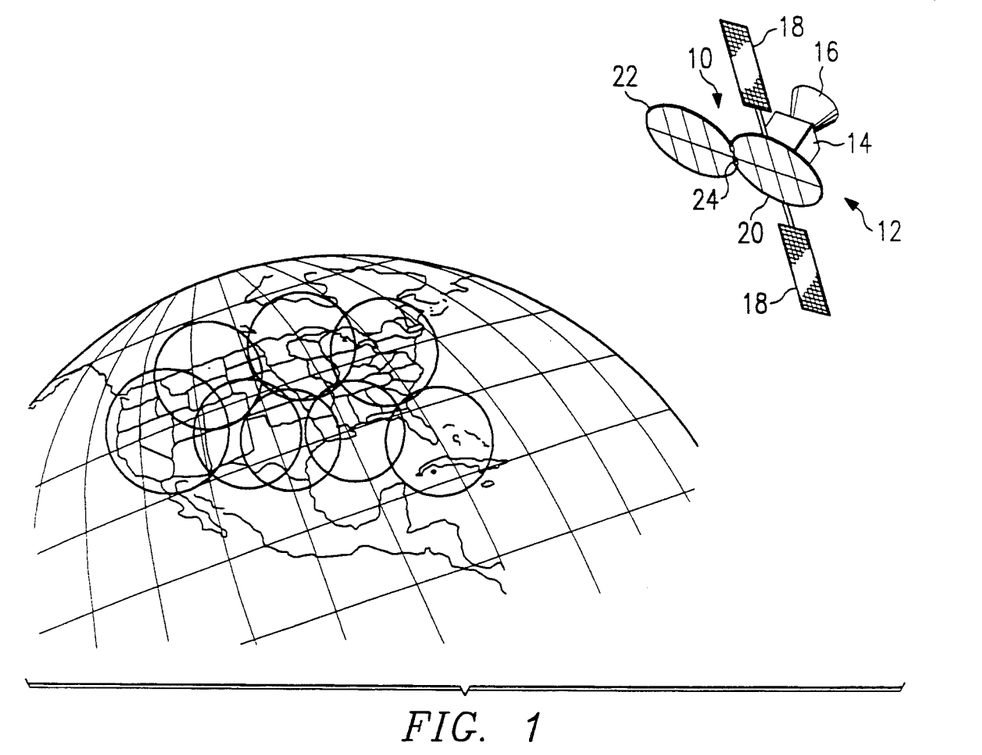
FIG. 1 is a perspective view of a satellite, with an antenna, embodying the present invention, mounted on the satellite, and a partial view of the earth having schematic representations of multiple beams, as indicated by circles.

Referring to the example of FIG. 1, it is possible to more fully understand the above described concept of phase and/or amplitude adjustment. In FIG. 1, eight beams are shown to be transmitted across the United States Under some circumstances it may be desirable to adjust geographic coverage and/or amplitude of one or more of the eight beams by adjusting the phase and/or amplitude of the radiation provided by one or more of the contributing transmit subarrays 32. For example, economic considerations may demand that a more intense beam be sent to the northeast than, for instance, to the southeast. While this could be achieved by controlling the relative power of the signals provided to channels 54, appropriate weighting of subsignals can also significanty contribute to the desired result. In another example it may be desirable to adjust directivity of the beams. This can, to a great extent, be appropriately realized by the selective dividing and/or phasing of the subsignals.

Referring to FIG. 4, it can be appreciated that receive system 52 operates in reverse relative to transmit system 50. That is, radiation received at receive subarrays 40 is transmitted from ports 102 in the form of up to n' signals to beamforming means 80, subsequent to filtering and amplifying of the up to n' signals at bandpass filters 98 and amplifiers 86, respectively.

It follows from FIGS. 4, 6a and 6b, that for receiving, dividing operations are performed by use of combining circuits 118 and combining operations are performed by dividing circuits 112. It should be appreciated that the ability to adjust the phase and weight of the subsignals developed by combining circuit 118 is less significant than for the transmitting mode in which control of geographic coverage and amplitude of the beams is a chief concern. Moreover, when receiving, m' signals are outputted, rather than inputted, at channels 81.

In another preferred embodiment of antenna 10 (FIG. 7) transmission and reception are performed in a single transmit/receive system 122. As will be recognized, transmit/receive system 122 is, in many ways, similar, in construction and operation, to transmit system 50 and receive system 52. Therefore, common elements of transmit/receive system 122 are given reference numerals similar to transmit system 50 and receive system 52, with the addition of a suffix "a."

Figure 7:
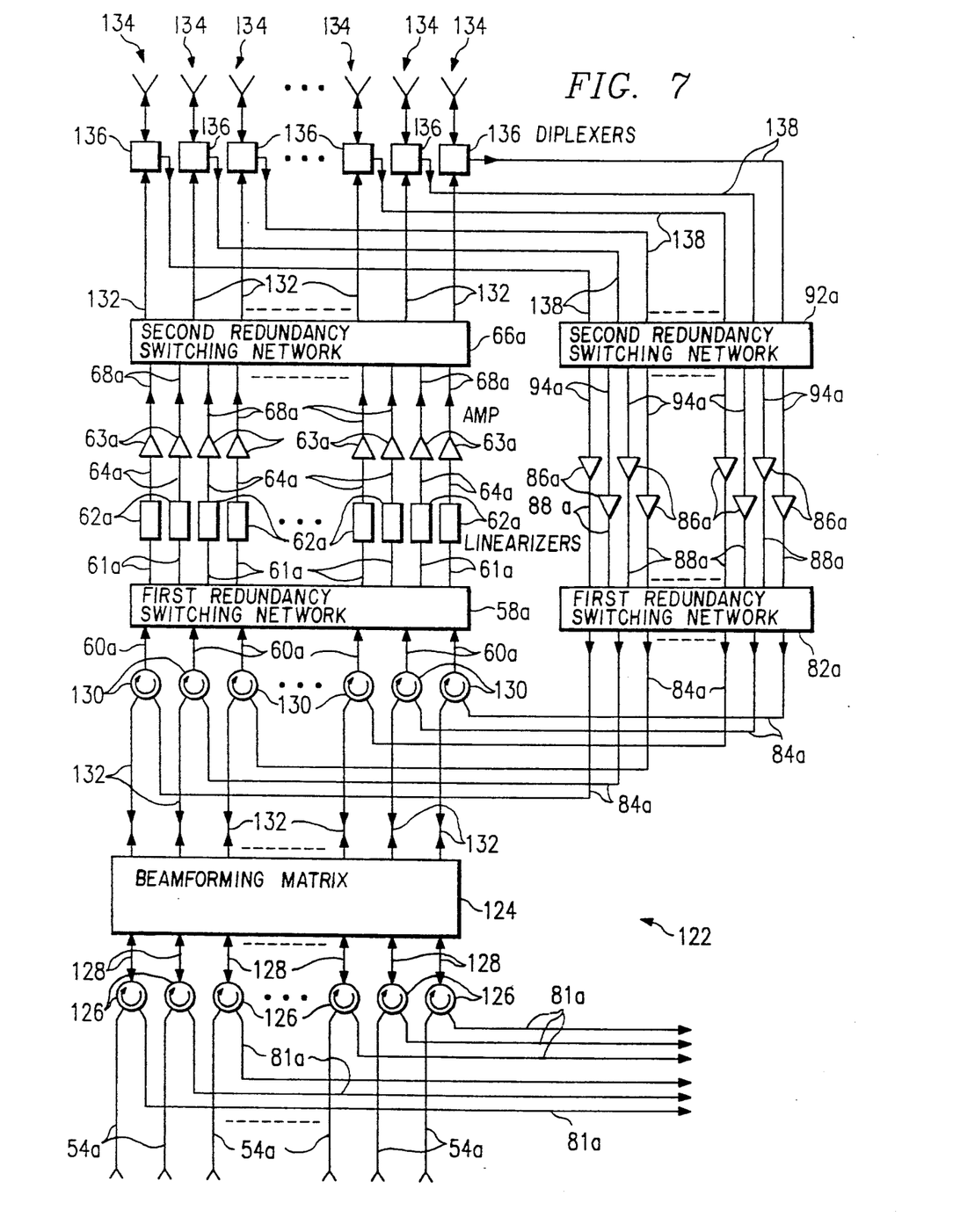
FIG. 7. is a transmit/receive system used in another preferred embodiment of the antenna.

As illustrated in FIG. 7, channels 54a and 81a are interconnected with beamforming means 124 by first circulator means 126 and channels 128. As should be appreciated, beamforming means 124 has the same structure as either beamforming means 56 or beamforming means 80, and first circulator means 126 could be a conventional circulating or diplexing device. Second circulator mens 130, which could also be a conventional circulating or diplexing device is interconnected with beamforming mens 124 via lines 132. Lines 60a and 84a respectively interconnect first redundancy switching networkd 58a and 82a with second circulator means 130.

On the transmit side, first redundancy, switching network 58a is interconnected with linearizers 62a via lines 61a, and amplifiers 63a are interconnected with linearizers 62a via lines 64a. Second redundancy switching network 66a is interconnected with amplifiers 63a by way of lines 68a, and output lines 132 are interconnected with transit/receive subarrays 134 through diplexer means 136.

As will be appreciated circulator means could be used in place of diplexer means 136; however, use of diplexer means 134 is perffered when possible since, in contrast to a circulator diplexer, means 136 is relatively lightweight and provides bandpass filtering. Nevertheless, when transmission and reception are performed at the same frequency, diplexing means 134 cannot be used, so that, in those situations requiring transmission and reception at the same frequency, alternative arrangements including circulators and filters may be required.

On the receive side, input lines 138 interconnect second redundancy switching network 92a with transmit/receive subarrays 134 via diplexer menas 136. Amplifiers 86a are interconnected with second redundancy switching network 92a via lines 94a, while lines 88a interconnect amplifiers 86a with first redundancy switching network 82a.

In operation, transmit/receive system 122 (FIG. 7) operates in the same manner as transmit system 50 when as many as m signals are transmitted from transmit/receive beamforming means 124 to transmit/receive subarrays 134. On the other hand, transmit/receive system 122 operates in the same manner as receive system 52 when beams received at transmit/receive subarrays 134 are transmitted to transmit/receive beamforming means 124.

In the foregoing description, it will be readily appreciated by those skilled in the art that modifications may be made to the invention without departing from the concepts disclosed herein. Such modifications are to be considered as included in the following claims unless these claims by their language expressly state otherwise.

What is claimed is:

1. A multiple-beam antenna for use on a satellite, comprising:

beamformer means for receiving two or more input transmission signals and providing two or more beamformer transmission signals, said beamformer means comprising :
dividing means for dividing said input tansmission signals into transmission subsignals;
phasing means for establishing the relative phases of said transmission subsignals;
weighting means for establishing the relative power ofsaid transmission subsignals; and
combining means for comging said transmission subsignals to provide said two or more beamformer transmission signals;
whrerein said dividing means, phasing means, weighting means and combining means are arranged in a matris configuration;

amplifier means coupled to said beamformer means for amplifying said two or more beamformer transmission signals; and antenna means coupled to said amplifier means for transmitting two or more beams, said antenna means comprising a plurality of antenna arrays, each of said arrays having a plurality of antenna elements.

2. A multiple-beam antenna, as recited in claim 1, wherein:
said dividing means is disposed on a plurality of sustantially parallel first planes; and
said conbining means is disposed on a plurality of substantially parallel second planes;
said first and said second planes being interconnected to define said matrix configuration.

3. A multiple-beam antenna, as recited in claim 2, wherein:
said phasing means is disposed on one of said first planes and said second planes; and
said weighting means is disposed on one of said first planes and said second planes.
said weighting means is disposed on one of said first planes and said second planes.

4. A multiple-beam antenna, as recited in claim 2, wherein the number of said first planes equals the number of said two or more input transmission signals.

5. A multiple-beam antenna, as recited in claim 2, wehrein the number of said second planes equals the number of said plurality of antenna arrays.

6. A multiple-beam antenna, as recited in claim 1, wherein said weighting means includes passive elements for establishing the relative power of said transmission subsignals.

7. A multiple-beam antenna, as recited in claim 1, wehrein said weighting means includes a plurality of microstrip lines of preselected widths for establishing the relative poer of said transmission subsignals.

8. A multiple-beam antenna, as recited in claim 1, wehrein said phasing means includes time delay means for establishing the relative phases of said transmission subsignals.

9. A multiple-beam antenna, as recited in claim 1, whrein said amplifier means includes a plurality of amplifiers in a one-to-one corrresponding relationship with said plurality of antenna arrays.

10. A multiple-beam antenna, as recited in claim 1, and further including linearizer means coupled between said antenna means and said amplifier means for maintaining the operation of the multiple-beam antenna in a linear range .

11. A multiple-beam antenna, as recited in claim 8, wherein said linearizer means includes a plurality of linearizers in a one-to-one corresponding relationship with said plurality of antenna arrays.

12. A multiple-beam antenna for use on a satellite, comprising:
antenna means for receiving two or more beams and providing two or more input reception signals, said antenna means comprising a plurality of antenna arrays, each of said arrays having a plurality of antenna elements; and
beamformer means for receiving said two or more input reception signals and providing two or more beamformer reception signals, said beamformer means comprising:
dividing means for dividing said input rectption signals into reception subsignals;
phasing means for establishing the relative phases of said reception subsignals;
weighting means for establishing the relative power of said reception subsignals; and
combining means for combining said reception subsignals to provide said two or more beamformer reception signals;
wherein said dividing means, phasing means, weighting means and combining means are arranged in a matrix configuration.

13. A multiple-beam antenna, as recited in claim 12, wherein:
said dividing means is disposed on a plurality of substantially parallel first planes; and
said conbining means is disposed on a plurality of sustantially parallel second planes;
said first and said second planes being interconnected to define said amtrix configuration.

14. A multiple-beam antenna, as recited in claim 13, wherein:
said phasing means is disposed on one of said first planes and said second planes; and
said weighting means is disposed on one of said first planes and said second planes.

15. A multiple-beam antenna, as recited in claim 12, wherein the number of said first planes equals the number of said two or more input reception signals.

16. A multiple-beam antenna, as recited in claim 12, wherein the number of said second planes equals the number of said plurality of antenna arrays.

17. A multiple-beam antenna, as recited in claim 12, wherein said weighting means includs passive elements for establishing the relative power of said reception subsignals.

18. A multiple-beam antenna, as recited in claim 12, wherein said weighting means includes a plurality of microstrip lines of preselected widths for establishing the relative power of said reception subsignals.

19. A multiple-beam antenna, as recited in claim 12, wherein said phasing means includes time dalay means for establishing the relative phases of said reception subsignals.

20. A multiple-beam antenna, as recited in claim 12, and further includign amplifier means coupled to said beamformer means for amplifying said two or more reception signals.

21. A multiple-beam antenna, as recited in claim 20, wherein said amplifier meaans includes a plurality of amplifiers in a one-to-one corresponding relationship with said plurality of antenna arrays.

22. A multiple-beam antenna, as recited in claim 12, and further including linearizer means coupled between said antenna means and said beamformer means for maintaining the oepration of the multiple-beam antenna in a linear range.

23. A multiple-beam antenna, as recited in claim 22, wherein said linearizer means includes a plurality of linearizers in a one-to-one corresponding relationship with said plurality of antenna arrays.

* * * * *